(12) United States Patent
Schultheis et al.

(10) Patent No.: US 8,628,115 B2
(45) Date of Patent: Jan. 14, 2014

(54) IMPACT ELEMENTS FOR A MOUNTING SYSTEM FOR A PRESSURE VESSEL

(75) Inventors: Valentin Schultheis, Darmstadt (DE); Thorsten Schutz, Selzen (DE); Helmut Schuermann, Maxdorf (DE); Wolfgang Bleser, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 571 days.

(21) Appl. No.: 12/897,840

(22) Filed: Oct. 5, 2010

(65) Prior Publication Data

US 2012/0080466 A1 Apr. 5, 2012

(51) Int. Cl.
*B60P 3/22* (2006.01)
(52) U.S. Cl.
USPC .......................................................... 280/834
(58) Field of Classification Search
USPC ................................... 280/830, 834; 188/371
See application file for complete search history.

(56) References Cited

U.S. PATENT DOCUMENTS

| | | | | |
|---|---|---|---|---|
| 5,004,120 A | * | 4/1991 | Hembert ........................ | 220/589 |
| 2008/0078598 A1 | * | 4/2008 | Essinger et al. ............. | 180/69.4 |
| 2009/0072521 A1 | * | 3/2009 | Jang et al. .................. | 280/728.2 |
| 2010/0252353 A1 | * | 10/2010 | Tsubokawa .................... | 180/314 |
| 2012/0049566 A1 | * | 3/2012 | Kiefer ......................... | 296/97.22 |
| 2012/0080875 A1 | * | 4/2012 | Schultheis et al. ............ | 280/834 |
| 2012/0161430 A1 | * | 6/2012 | Mulanon ....................... | 280/834 |

\* cited by examiner

*Primary Examiner* — Tashiana Adams
(74) *Attorney, Agent, or Firm* — Fraser Clemens Martin & Miller LLC; J. Douglas Miller

(57) ABSTRACT

A storage system for a vehicle is disclosed. The storage system includes a pressure vessel, a plurality of mounting systems disposed on each end of the pressure vessel, each mounting system having a vessel shell having an end coupled to the end of the pressure vessel, a mounting shell having a first end coupled to the vehicle and a second end coupled to another end of the vessel shell, and an impact element formed in one of the vessel shell and the mounting shell having a yield strength less than a yield strength of the vessel shell and the mounting shell, a clamping element for coupling the vessel shell to the pressure vessel, and a coupling means for coupling the vessel shell and the mounting shell together through the impact element.

20 Claims, 4 Drawing Sheets

US 8,628,115 B2

IMPACT ELEMENTS FOR A MOUNTING SYSTEM FOR A PRESSURE VESSEL

FIELD OF THE INVENTION

The invention relates to pressure vessels, and more particularly to a mounting system for a pressure vessel having an impact element.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in a fuel cell stack to form a fuel cell system. The fuel is typically stored in large, hollow, substantially cylindrical pressure vessels disposed on an undercarriage of the vehicle.

The pressure vessel is typically multi-layered and includes at least an inner liner and a filament wound outer layer. The pressure vessel is typically coupled to a frame or other structure of a vehicle in which the vessel is used. To provide the vehicle with a desired travel range and a vehicle appearance consistent with consumer needs, a plurality of the pressure vessels may be required. Conventional mounting systems typically include a plurality of circumferential bands fastened to a support structure. The mounting systems may be of considerable size and weight that may restrict service of the pressure vessel. Furthermore, conventional mounting systems do not allow for the movement of the pressure vessel in the event of a side or rear impact event. In the event of the side or rear impact event, the outer layer and/or the inner shell of the vessel may be breached, the restraining means may be irreparably altered, or the restraining means and pressure vessel may be caused to shift to an undesired angle or from a desired location to contact another component of the vehicle.

It would be desirable to develop a mounting system adapted to absorb at least a portion of forces on the pressure vessel caused by a side or rear impact event without breaching the pressure vessel, altering the restraining means, or movement of the restraining means and/or the pressure vessel.

SUMMARY OF THE INVENTION

Concordant and congruous with the present invention, develop a mounting system adapted to absorb at least a portion of forces on the pressure vessel caused by a side or rear impact event without breaching the pressure vessel, altering the restraining means, or movement of the restraining means and/or the pressure vessel has surprisingly been discovered.

In one embodiment, a mounting system comprises a vessel shell having an end coupled to a first body; a mounting shell having an end coupled to another end of said vessel shell and another end coupled to a second body; and an impact element formed in one of said vessel shell and said mounting shell having a yield strength less than said vessel shell and said mounting shell.

In another embodiment, a storage system for a vehicle, the system comprises a pressure vessel; a mounting system disposed on an end of said pressure vessel, said mounting system further comprising a vessel shell having an end coupled to the end of said pressure vessel, a mounting shell having a first end coupled to the vehicle and a second end coupled to another end of the vessel shell, and an impact element formed in one of the vessel shell and the mounting shell having a yield strength less than a yield strength of the vessel shell and the mounting shell; a clamping element for coupling the vessel shell to the pressure vessel; and a coupling means disposed adjacent the impact element for coupling the vessel shell and the mounting shell together.

In another embodiment, A storage system for a vehicle, the system comprises a pressure vessel; a pair of mounting systems disposed on an end of said pressure vessel, each mounting system further comprising a vessel shell having an end coupled to the end of said pressure vessel, a mounting shell having a first end coupled to the vehicle and a second end coupled to another end of the vessel shell, and a plurality of impact elements formed in one of the vessel shell and the mounting shell having a yield strength less than a yield strength of the vessel shell and the mounting shell; another pair of mounting systems disposed on another end of said pressure vessel, each mounting system having a vessel shell having an end coupled to the end of said pressure vessel, a mounting shell having a first end coupled to the vehicle and a second end coupled to another end of the vessel shell, and a plurality of impact elements formed in one of the vessel shell and the mounting shell having a yield strength less than a yield strength of the vessel shell and the mounting shell; a clamping element for coupling the vessel shell to the pressure vessel; and a coupling means disposed adjacent the impact element for coupling the vessel shell and the mounting shell together.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
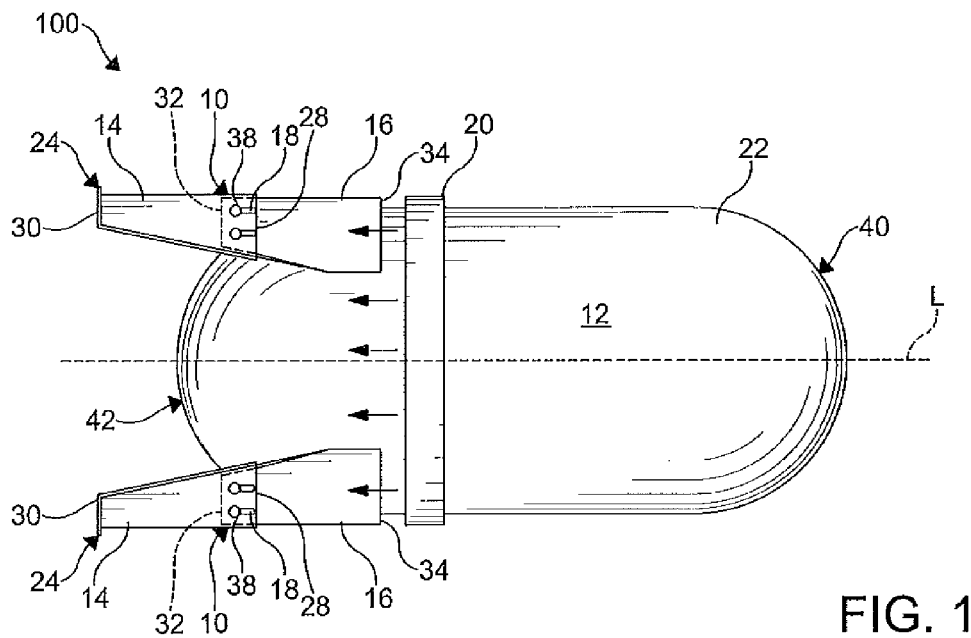
FIG. 1 is a front elevational view of a partially-assembled mounting system for a pressure vessel according to an embodiment of the present invention.

The following detailed description and appended drawings describe and illustrate various embodiments of the invention. The description and drawings serve to enable one skilled in the art to make and use the invention, and are not intended to limit the scope of the invention in any manner.

FIGS. 1-6 illustrate a storage system 100 including a plurality of mounting systems 10 and a pressure vessel 12 according to an embodiment of the invention. Each mounting system 10 includes a mounting shell 14, a vessel shell 16, and an impact element 18. It is understood that the mounting systems 10 may be disposed between and coupled to a first body and a second body other than a pressure vessel 12 and a vehicle 26 as described hereinbelow. For example, one or more of the mounting systems 10 may be coupled to and disposed between two internal components of a vehicle or other structure, or one or more of the mounting systems 10 may be coupled between an internal component and the vehicle 26.

In the embodiment shown, a pair of mounting systems 10 is fixed to each end of the pressure vessel 12 by a pair of clamping elements 20. The clamping elements 20 are rings adapted to couple the mounting systems 10 to the pressure vessel 12 to militate against the relative movement between the mounting systems 10 and the pressure vessel 12. The clamping elements 20 may frictionally engage the mounting systems 10 to couple the mounting systems 10 to the pressure vessel 12. It is understood that the clamping elements 20 may be an elongate member having ends adapted to be mechanically fixed together to form the clamping elements 20 around the mounting systems 10. It is understood that any number of mounting systems 10 may be coupled to the pressure vessel 12, and any number of clamping elements 20 may be used to couple the mounting systems 10 to the pressure vessel 12, as desired.

The pressure vessel 12 is formed by an inner liner (not shown) formed from a polymeric material and an outer layer 22 formed by a filament winding process. The pressure vessel 12 has a substantially cylindrical shape and is adapted to hold a pressurized fluid (not shown). The inner liner of the pressure vessel 12 may be formed from a main body having a pair of hemispherical end caps fixed thereto, or the pressure vessel 12 may be formed from a unitary material, as desired. Once the inner liner is formed, the outer layer 22 is filament wound therearound. It is understood that the pressure vessel 12 may have any shape as desired, and the pressure vessel 12 may include additional layers such as a barrier layer, a foil layer, and the like, as desired. The pressurized fluid may be any fluid such as a gas such as hydrogen gas, compressed natural gas, and oxygen gas, a liquid, or both a liquid and a gas, for example.

Figure 6:
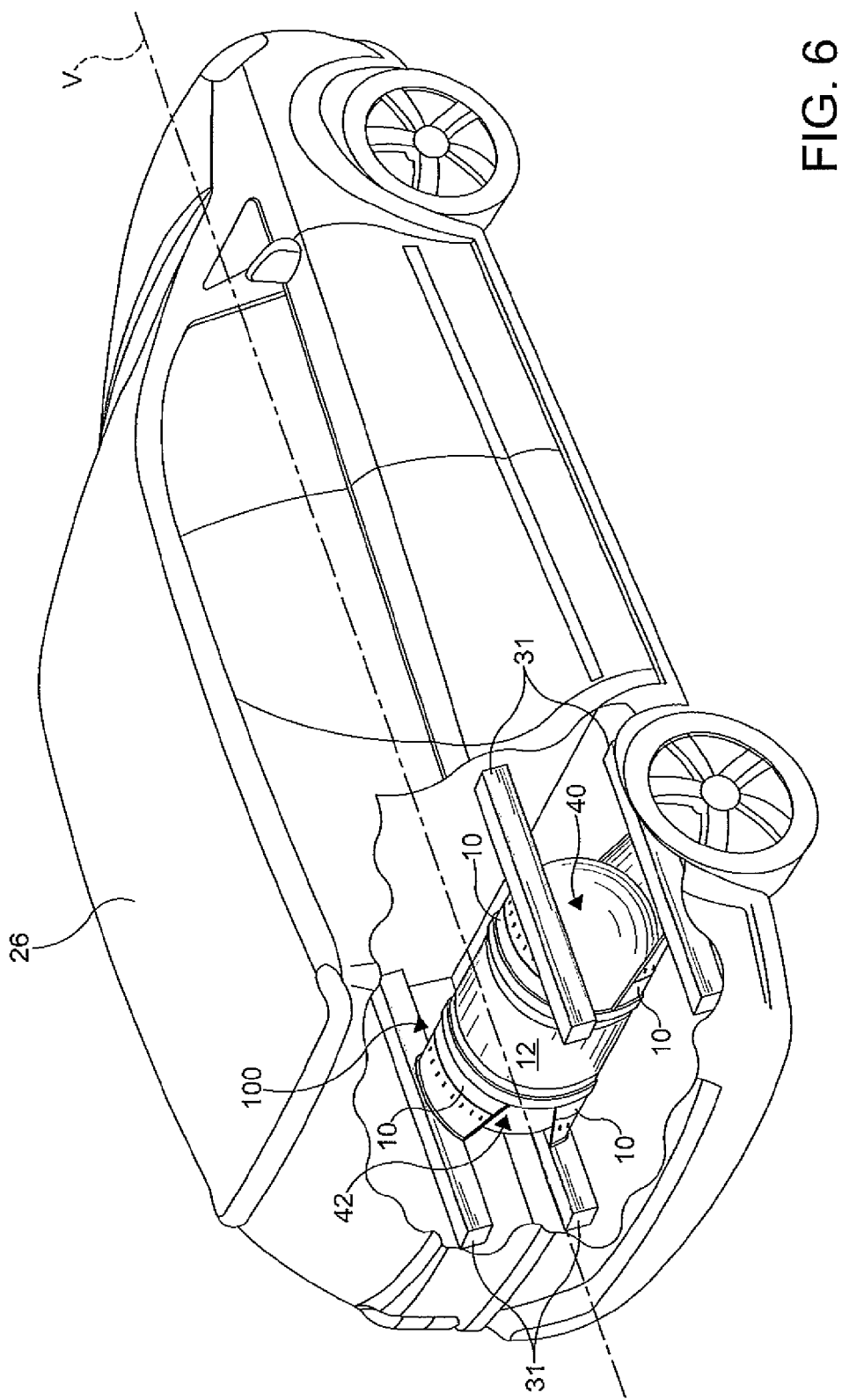
FIG. 6 is a perspective view of a vehicle incorporating the mounting system of FIGS. 1-5.

The mounting shell 14 includes a first end 24 adapted to be coupled to the vehicle 26 (as best shown in FIG. 6) and a second end 28 adapted to be coupled to the vessel shell 16. As best shown in FIGS. 1, 2, 5, and 6, the mounting shell 14 has a generally arcuate cross-sectional shape. The mounting shell 14 cross-sectional shape may be an arc of a circle, a semicircle, or a circle, as desired. The mounting shell 14 is formed from polymeric material such as a fiber-reinforced polymer, for example a sheet molding compound (SMC), but the mounting shell may be formed from another moldable material, such as a metal, a plastic, an alloy, glass, and the like, for example. Favorable results have been obtained from mounting shells 14 formed from glass fiber reinforced plastics. It is understood that the glass fibers may be randomly dispersed throughout the polymer, or the glass fibers may be aligned perpendicular to a longitudinal axis L of the pressure vessel 12 or parallel thereto. The first ends 24 of the mounting shells 14 include a flange 30 adapted to cooperate with a suitable fastener to mount the mounting shells 14 of the mounting systems 10 to a frame, a side rail 31, or other longitudinal beam or structure of the vehicle 26. It is further understood that the mounting shell 14 may include additional unidirectional layers from one of the moldable materials, beads or fins, and/or webs of material adapted to militate against a buckling or the shell 14, as desired.

The vessel shell 16 includes a first end 32 adapted to be coupled to the second end 28 of the mounting shell 14, and a second end 34 abutting the pressure vessel 12. As best shown in FIGS. 1, 2, 5, and 6, the vessel shell 16 has a substantially arcuate cross-sectional shape. The vessel shell 16 cross-sectional shape may be an arc of a circle, a semicircle, or a circle as desired. The vessel shell 16 is formed from a fiber-reinforced polymer, for example a sheet molding compound (SMC), but the mounting shell 14 may be formed from another moldable material, such as a metal, a plastic, an alloy, glass, and the like, for example. Favorable results have been obtained from vessel shells 16 formed from glass fiber reinforced plastics. It is understood that the glass fibers may be randomly dispersed throughout the polymer, or the glass fibers may be aligned perpendicular to a longitudinal axis L of the pressure vessel 12 or parallel thereto. It is further understood that the vessel shell 16 may include additional unidirectional layers from one of the moldable materials, beads or fins, and/or webs of material adapted to militate against a buckling or the shell 16, as desired.

Figure 4:
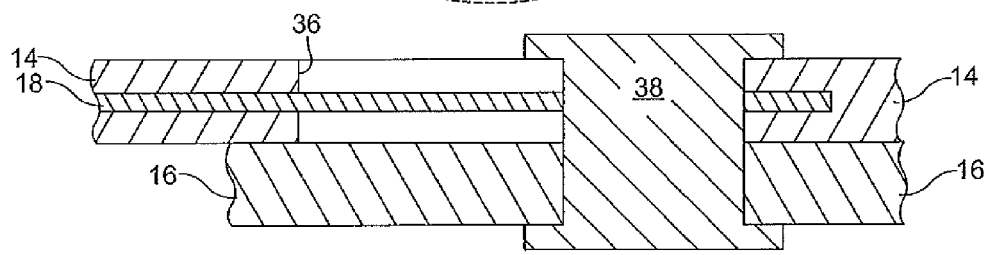
FIG. 4 is a fragmentary cross-sectional view of the impact element and the coupling means shown in FIG. 3 taken along line 4-4.
Figure 5:
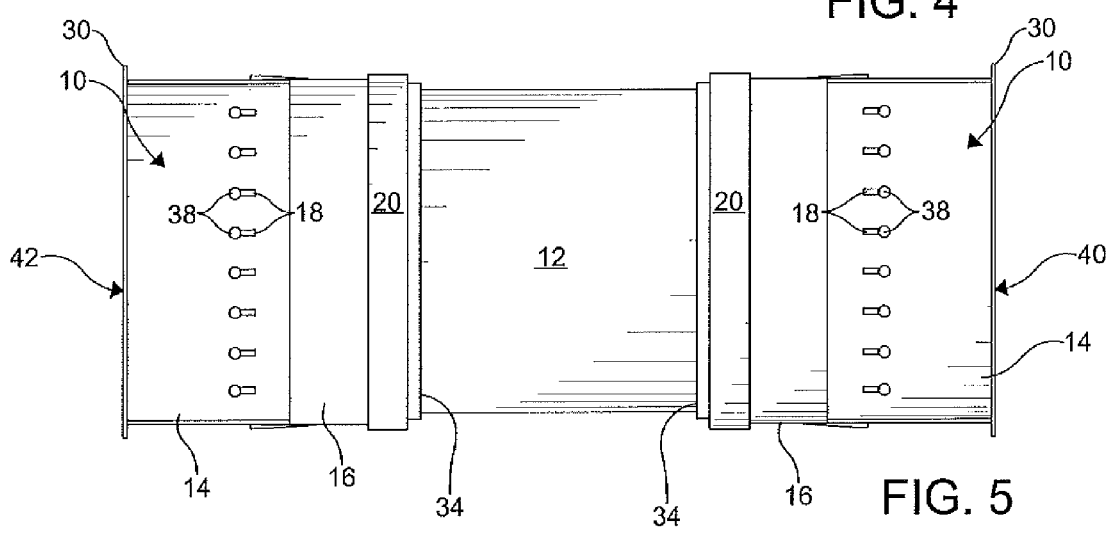
FIG. 5 is a top plan view of the mounting system shown in FIGS. 1 and 2.

As best shown in FIG. 4, the impact element 18 is disposed intermediate a top surface and a bottom surface of the mounting shell 14. The impact element 18 is defined as the portion of the material disposed across one of the apertures 36 formed in the mounting shell 14 regardless of how each impact element 18 is formed. For example, each impact element 18 may be separately formed from a material and disposed between the surfaces of the mounting shell 14, or the impact elements 18 may be formed from a unitary sheet of material disposed between the surfaces of the mounting shell 14. The unitary sheet of material forming the impact elements 18 may be coextensive with the materials forming the surfaces of the mounting shell 14, or the unitary sheet may extend through only a portion of the mounting shell 14. Each mounting shell 14 includes a plurality of impact elements 18 formed adjacent the first end 28 of the mounting shell 14 and evenly distributed across a circumference of the mounting shell 14. Favorable results have been obtained with mounting shells 14 having eight impact elements 18 (as shown in FIGS. 1, 2, 5, and 6), but any number of impact elements 18 may be formed in the mounting shells 14. Each impact element 18 is formed from one of a ductile metal or a polymeric material, such as a fiber reinforced plastic, for example, having a yield strength less than a yield strength of the material(s) forming the mounting shells 14 and the vessel shells 16. It is understood that the glass fibers of the impact element 18 may be randomly dispersed throughout the polymer, or the glass fibers may be aligned perpendicular to a longitudinal axis L of the pressure vessel 12 or parallel thereto. Favorable results have been obtained by impact elements 18 having glass fibers aligned perpendicular to the longitudinal axis L of the pressure vessel 12. The perpendicularly aligned fibers of the impact elements 18 provide sufficient strength necessary to bear loads in the direction perpendicular to the longitudinal axis L. The impact element 18 may be formed as an intermediate layer of the entire mounting shell 14, or the impact element 18 may be an intermediate layer of only a portion of the mounting shell 14. The mounting shell 14 includes one of the apertures 36 across which the impact element 18 is disposed. Each of the apertures 36 has a longitudinal axis A substantially parallel to the longitudinal axis L of the pressure vessel 12, but the longitudinal axis A may be perpendicular to the longitudinal axis L of the pressure vessel 12. The longitudinal axis A of the aperture is also the longitudinal axis of the impact element 18 disposed therethrough. In another embodiment of the invention, the aperture 36 and the impact element 18 are formed in the vessel shell 16 rather than the mounting shell 14. However, it is desirable to form the impact element in the mounting shell 14 to facilitate rapid replacement of a mounting shell 14 in need of replacement. In yet another embodiment of the invention, the impact element 18 as described hereinabove is formed in both the vessel shell 16 and the mounting shell 14 with the apertures 36 of each shell 14, 16 substantially aligned.

Figure 2:
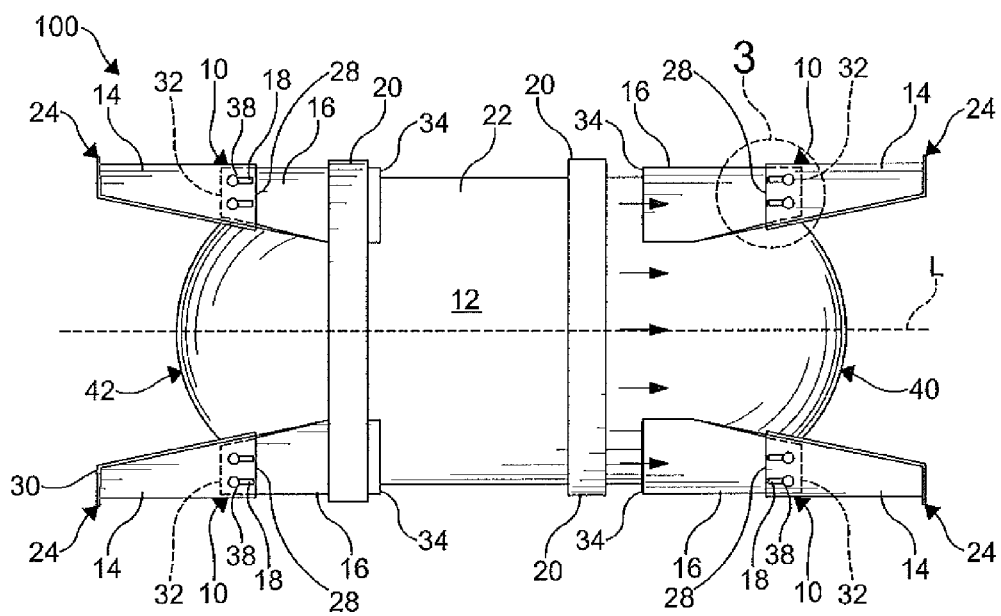
FIG. 2 is a front elevational view of the mounting system for a pressure vessel shown in FIG. 1 having an assembled clamping element and an unassembled clamping element.
Figure 3:
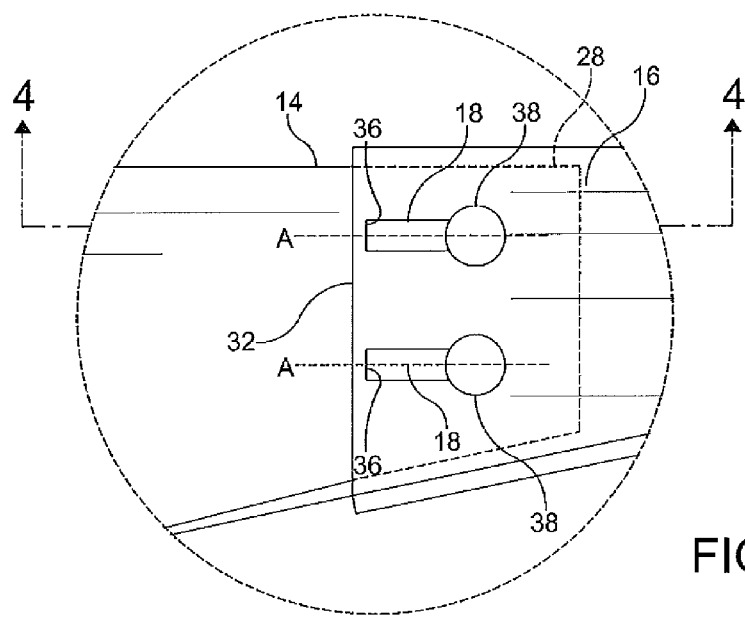
FIG. 3 is an enlarged fragmentary front elevational view of an impact element and a coupling means of the mounting system shown in FIG. 2.

To assemble the storage system 100, the second end 28 of the mounting shell 14 and the first end 32 of the vessel shell 16 are coupled together by a coupling means 38. As shown in FIGS. 1 and 2, a portion of the second end 28 of the mounting shell 14 overlaps a portion of the first end 32 of the vessel shell 16. As best shown in FIG. 4, the coupling means 38 extends through the aperture 36 to couple the vessel shell 16 to the mounting shell 14. At least a portion of the coupling means 38 abuts the impact element 18, or, as shown in FIG. 4, the coupling means 38 may be disposed through the impact element 18. In the present embodiment, the coupling means 38 is a rivet, but the coupling means 38 may be a bolt, screw, or other coupling means suitable for coupling the vessel shell 16 to the mounting shell 14 and abutting the impact element 18. A pair of mounting systems 10 is disposed on a first end 40 of the pressure vessel 12 with a substantial portion of the vessel shell 16 of each mounting system 10 abutting the pressure vessel 12. One of the clamping elements 20 is then disposed over a portion of the second ends 34 of each vessel shell 16 to couple the mounting systems 10 to the first end 40 of the pressure vessel 12. Another pair of mounting systems 10 is disposed on a second end 42 of the pressure vessel 12 with another of the clamping elements 20. The flanges 30 of the first ends 24 of the mounting shells 14 of each mounting system 10 are coupled to a corresponding side rail 31 of the vehicle 26. When mounted to the vehicle 26, the longitudinal axis A of each of the impact elements 18 and the longitudinal axis L of the pressure vessel 12 are perpendicular to a longitudinal axis V of the vehicle 26. It is understood that the longitudinal axis A of each of the impact elements 18 and the longitudinal axis L of the pressure vessel 12 may be parallel to the longitudinal axis V of the vehicle 26, as desired. Alternatively, the mounting systems 10 and clamping elements 20 may be pre-assembled and then pressed or otherwise mounted on the pressure vessel 12. Furthermore, the mounting shell 14 and/or the vessel shell 16 may include holes formed therein (not shown) to facilitate cables or other mounting hardware therethrough or to facilitate a flow of air therethrough. The size and number of holes may vary based on the contents of the pressure vessel 12 and the load(s) on the shells 14, 16, and the combination of shells 12, 14 or mounting systems 10 may also vary.

In the event of a side impact event, a force on a side of the vehicle 26 causes the side rails 31 on the side of the vehicle 26 to impart a force on the mounting shells 14 of the mounting systems 10 coupled thereto and to the first end 40 of the pressure vessel 12. It is understood that a side impact event includes any impact event on the vehicle 26 that imparts any force on the vehicle in a direction parallel to the longitudinal axis L of the pressure vessel 12 and perpendicular to the longitudinal axis V of the vehicle 26. If the force on the mounting shells 14 is less than the impact strength of the impact elements 18, the impact elements 18 may elastically deform. If the force on the mounting shells 14 is greater than the yield strength of the impact elements 18, the force causes the coupling means 38 to impart a force on the impact elements 18, thereby causing the rupture of the impact elements 18. The rupturing of the impact elements 18 facilitates the movement of the mounting shells 14 toward the vessel shells 16, and at least a portion of the force from the side impact event is absorbed by the mounting systems 10 and impact elements 18. Once the impact elements 18 are ruptured through, the coupling means 38 will abut a portion of the mounting shells 14 on an opposite end of the aperture 36, and the portions of the shells 14, 16 that overlap will increase. Once the impact elements 18 are ruptured through and if the force of the side impact is sufficient, the force from the side impact event is distributed through the pressure vessel 12 and to the mounting systems 10 disposed on the second end 42 of the pressure vessel 12. If the force on the vessel shells 16 disposed on the second end 42 is less than the impact strength of the impact elements 18 thereof, the impact elements 18 may elastically deform. If the force on the vessel shells 16 is greater than the yield strength of the impact elements 18, the impact elements 18 will impart a force on the coupling means 38, causing the impact elements 18 to rupture, thereby facilitating the movement of the vessel shells 16 toward the mounting shells 14. Once the impact elements 18 are ruptured through, the coupling means 38 will abut a portion of the mounting shells 14 on an opposite end of the aperture 36 and the portions of the shells 14, 16 that overlap will increase. Since the impact elements 18 have yield strengths less than the yield strengths of the shells 14, 16, the impact elements 18 are adapted to be frangible and to rupture and absorb at least a portion of the force from the side impact event to militate against damage to the pressure vessel 12 and/or the shells 14, 16. Furthermore, because the shells 14, 16 are able to absorb at least a portion of the force and move relative to one another, undesired movement of the pressure vessel 12 is minimized.

Figure 7:
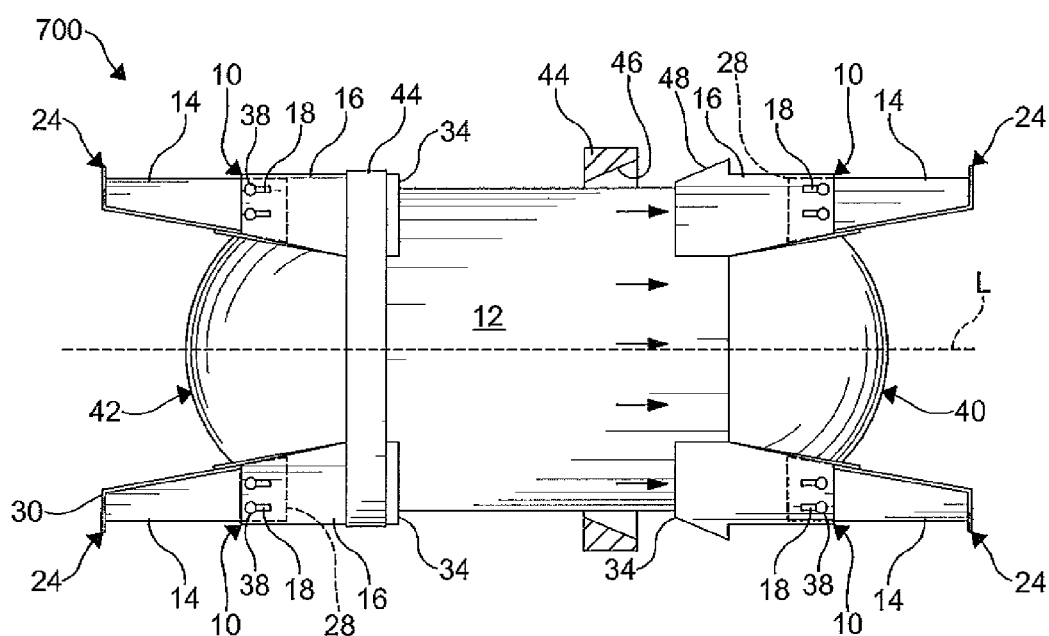
FIG. 7 is a front elevational view of a partially assembled mounting system for a pressure vessel according to another embodiment of the present invention with one of a pair of coupling elements shown in cross-section.

FIG. 7 illustrates a storage system 700 substantially similar to the storage system 100 described hereinabove except as explained hereinbelow. The storage system 700 includes a plurality of mounting systems 10 and a pressure vessel 12 according to another embodiment of the invention. Each mounting system 10 includes a mounting shell 14, a vessel shell 16, and an impact element 18. In the embodiment shown, a pair of mounting systems 10 is fixed to each end of the pressure vessel 12 by a pair of clamping elements 44. The clamping elements 44 are rings adapted to couple the mounting systems 10 to the pressure vessel 12 to militate against relative movement between the mounting systems 10 and the pressure vessel 12. The clamping elements 44 include an inner surface having a beveled edge 46 adapted to engage and mate with a corresponding beveled edge 48 of the mounting systems 10, thereby coupling the mounting systems 10 to the pressure vessel 12. It is understood that each of the clamping elements 44 may be an elongate member having ends adapted to be mechanically fixed together to form the clamping elements 44 around the mounting systems 10. The beveled edges 44, 46 cooperate to militate against the movement of the clamping elements 44 toward the mounting shells 14 at each end of the pressure vessel 12.

To assemble the storage system 700, a second end 28 of the mounting shell 14 and a first end 32 of the vessel shell 16 are coupled together by a coupling means 38. A portion of the first end 32 of the vessel shell 16 overlaps a portion of the second end 28 of the mounting shell 14. The coupling means 38 extends through the aperture 36 to couple the vessel shell 16 to the mounting shell 14. At least a portion of the coupling means 38 abuts the impact element 18. A pair of mounting systems 10 is disposed on a first end 40 of the pressure vessel 12 with a substantial portion of the vessel shell 16 of each mounting system 10 abutting the pressure vessel 12. One of the clamping elements 44 is then disposed over a portion of the second ends 34 of each vessel shell 16 with the beveled edges 46, 48 abutting to couple the mounting systems 10 to the first end 40 of the pressure vessel 12. Another pair of mounting systems 10 is disposed on a second end 42 of the pressure vessel with another of the pair of clamping elements 44. The flanges 30 of the first ends 24 of the mounting shells 14 of each mounting system 10 are then coupled to a corresponding side rail (not shown) of a vehicle (not shown). When mounted to the vehicle 26, the longitudinal axis A of each of the impact elements 18 and the longitudinal axis L of the pressure vessel 12 are perpendicular to a longitudinal axis of the vehicle 26. It is understood that the longitudinal axis A of each of the impact elements 18 and the longitudinal axis L of the pressure vessel 12 may be parallel to a longitudinal axis V of the vehicle 26, as desired.

In the event of a side impact event, a force on a side of the vehicle 26 causes the side rails 31 on the side of the vehicle 26 to impart a force on the mounting shells 14 of the mounting systems 10 coupled thereto and to the first end 40 of the pressure vessel 12. It is understood that a side impact event includes any impact event on the vehicle 26 that imparts any force on the vehicle 26 in a direction parallel to the longitudinal axis L of the pressure vessel 12 and perpendicular to the longitudinal axis V of the vehicle 26. If the force on the mounting shells 14 is less than the impact strength of the impact elements 18, the impact elements 18 may elastically deform. If the force on the mounting shells 14 is greater than the yield strength of the impact elements 18, the force causes the coupling means 38 to impart a force on the impact elements 18, thereby causing the rupture of the impact elements 18. The rupturing of the impact elements 18 facilitates the movement of the mounting shells 14 toward the vessel shells 16, and at least a portion of the force from the side impact event is absorbed by the mounting systems 10 and impact elements 18. Once the impact elements 18 are ruptured through, the coupling means 38 will abut a portion of the mounting shells 14 on an opposite end of the aperture 36, and the portions of the shells 14, 16 that overlap will increase. Once the impact elements 18 are ruptured through and if the force of the side impact is sufficient, the force from the side impact event is distributed through the pressure vessel 12 and to the mounting systems 10 disposed on the second end 42 of the pressure vessel 12. If the force on the vessel shells 16 disposed on the second end 42 of the pressure vessel 12 is less than the impact strength of the impact elements 18 thereof, the impact elements 18 may elastically deform. If the force on the vessel shells 16 is greater than the yield strength of the impact elements 18, the impact elements 18 will impart a force on the coupling means 38 causing the impact elements 18 to rupture, thereby facilitating the movement of the vessel shells 16 toward the mounting shells 14. Once the impact elements 18 are ruptured through, the coupling means 38 will abut a portion of the mounting shells 14 on an opposite end of the aperture 36 and the portions of the shells 14, 16 that overlap will increase. Since the impact elements 18 have yield strengths less than the yield strengths of the shells 14, 16, the impact elements 18 are adapted to be frangible and to rupture and absorb at least a portion of the force from the side impact event to militate against damage to the pressure vessel 12 and/or the shells 14, 16. Furthermore, because the shells 14, 16 are able to absorb at least a portion of the force and move relative to one another, undesired movement of the pressure vessel 12 is minimized.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A mounting system comprising:
   a vessel shell having an end coupled to a first body;
   a mounting shell having an end coupled to another end of said vessel shell and another end coupled to a second body; and
   an impact element formed in one of said vessel shell and said mounting shell having a yield strength less than said vessel shell and said mounting shell.

2. A storage system for a vehicle, the system comprising:
   a pressure vessel;
   a mounting system disposed on an end of said pressure vessel, said mounting system further comprising a vessel shell having an end coupled to the end of said pressure vessel, a mounting shell having a first end coupled to the vehicle and a second end coupled to another end of the vessel shell, and an impact element formed in one of the vessel shell and the mounting shell having a yield strength less than a yield strength of the vessel shell and the mounting shell;
   a clamping element for coupling the vessel shell to the pressure vessel; and
   a coupling means disposed adjacent the impact element for coupling the vessel shell and the mounting shell together.

3. The storage system according to claim 2, further comprising a second mounting system disposed on another end of said pressure vessel having an end coupled to the other end of said pressure vessel, a mounting shell having a first end coupled to the vehicle and a second end coupled to another end of the vessel shell, and an impact element formed in one of the vessel shell and the mounting shell having a yield strength less than a yield strength of the vessel shell and the mounting shell.

4. The storage system according to claim 2, wherein each of the vessel shell and the mounting shell is formed from one of a polymeric material and a metal.

5. The storage system according to claim 4, wherein the polymeric material is a fiber-reinforced polymer.

6. The storage system according to claim 2, wherein the impact element is formed from one of a fiber-reinforced polymer and a ductile metal.

7. The storage system according to claim 6, wherein fibers of the fiber-reinforced polymer are disposed perpendicular to a longitudinal axis of said pressure vessel.

8. The storage system according to claim 2, wherein the impact element is formed across an aperture formed in one of the vessel shell and the mounting shell.

9. The storage system according to claim 2, further comprising a plurality of impact elements formed in one of the vessel shell and the mounting shell.

10. The storage system according to claim 9, wherein the plurality of impact elements is formed in the vessel shell.

11. The storage system according to claim 9, wherein the plurality of impact elements is formed in the mounting shell.

12. The storage system according to claim 2, wherein said clamping element is a ring adapted to frictionally engage the vessel shell to couple the vessel shell to said pressure vessel.

13. The storage system according to claim 12, wherein said clamping element includes a beveled edge abutting a beveled edge formed on the vessel shell.

14. The storage system according to claim 2, wherein the cross-sectional shape of the vessel shell and the mounting shell is one of an arc, a semicircle, or a circle.

15. The storage system of claim 2, further comprising a flange formed on the first end of the mounting shell for coupling the mounting shell to the vehicle.

16. The storage system of claim 2, wherein at least one of the vessel shell and the mounting shell includes one of a unidirectional layer formed from a moldable material, a plurality of beads, a plurality of fins, and webs adapted to militate against a buckling of the at least one vessel shell and mounting shell.

17. A storage system for a vehicle, the system comprising:
a pressure vessel;
a pair of mounting systems disposed on an end of said pressure vessel, each mounting system further comprising a vessel shell having an end coupled to the end of said pressure vessel, a mounting shell having a first end coupled to the vehicle and a second end coupled to another end of the vessel shell, and a plurality of impact elements formed in one of the vessel shell and the mounting shell having a yield strength less than a yield strength of the vessel shell and the mounting shell;
another pair of mounting systems disposed on another end of said pressure vessel, each mounting system having a vessel shell having an end coupled to the end of said pressure vessel, a mounting shell having a first end coupled to the vehicle and a second end coupled to another end of the vessel shell, and a plurality of impact elements formed in one of the vessel shell and the mounting shell having a yield strength less than a yield strength of the vessel shell and the mounting shell;
a clamping element for coupling the vessel shell to the pressure vessel; and
a coupling means disposed adjacent the impact element for coupling the vessel shell and the mounting shell together.

18. The storage system according to claim 17, wherein each of the vessel shell and the mounting shell is formed from one of a fiber-reinforced polymer and a metal.

19. The storage system according to claim 17, wherein the impact elements are formed from one of a fiber-reinforced polymer, wherein fibers of the fiber-reinforced polymer are disposed perpendicular to a longitudinal axis of said pressure vessel.

20. The storage system according to claim 17, wherein the plurality of impact elements is formed in the vessel shell.

* * * * *